(12) United States Patent
Etemad (10) Patent No.: US 9,544,099 B2
(45) Date of Patent: Jan. 10, 2017

(54) USER EQUIPMENT, EVOLVED NODE B, AND METHOD FOR MULTICAST DEVICE-TO-DEVICE COMMUNICATIONS

(71) Applicant: Kamran Etemad, Potomac, MD (US)

(72) Inventor: Kamran Etemad, Potomac, MD (US)

(73) Assignee: Intel Corporation, Santa Clara, CA (US)

( * ) Notice: Subject to any disclaimer, the term of this patent is extended or adjusted under 35 U.S.C. 154(b) by 402 days.

(21) Appl. No.: 13/716,919

(22) Filed: Dec. 17, 2012

(65) Prior Publication Data

US 2014/0003319 A1 Jan. 2, 2014

Related U.S. Application Data (60) Provisional application No. 61/667,325, filed on Jul. 2, 2012.

(51) Int. Cl.
*H04W 4/00* (2009.01)
*H04L 1/18* (2006.01)
(Continued)

(52) U.S. Cl.
CPC ........... *H04L 1/1861* (2013.01); *H04L 1/0025* (2013.01); *H04L 1/0026* (2013.01); *H04L 1/1628* (2013.01);
(Continued)

(58) Field of Classification Search
CPC .. H04L 1/1867; H04L 65/104; H04L 65/1006; H04L 65/1083; H04L 65/1009; H04L 12/185; H04L 69/28; H04L 69/04; H04L 69/22; H04L 12/189; H04L 12/1836; H04L 12/2856; H04L 12/4633; H04L 47/10; H04L 47/14; H04L 47/30; H04L 47/34; H04L 47/32; H04L 1/0026; H04L 1/0028; H04L 1/1664; H04L 1/1841; H04L 12/1886; H04L 12/4641; H04W 28/06; H04W 72/005; H04W 28/12; H04W 36/02; H04W 72/0413; H04W 72/121; H04W 72/042; H04W 56/00; H04W 76/028; B65D 88/76; B65D 88/04; G06Q 30/02; G06Q 30/0256; G11C 16/349; G11C 16/3418
See application file for complete search history.

(56) References Cited

U.S. PATENT DOCUMENTS 5,767,363 A * 6/1998 De Silva et al. ............. 800/281
7,070,113 B2 * 7/2006 Shiraishi et al. ............. 235/492
(Continued)

FOREIGN PATENT DOCUMENTS

CN 104737562 A 6/2015
JP 2006516080 A 6/2006
(Continued)

OTHER PUBLICATIONS

"Evolved Universal Terrestrial Radio Access (E-UTRA); Medium Access Control (MAC) protocol specification", 3GPP TS 36.321 V10.5.0. Technical Specification Group Radio Access Network. Release 10., (Mar. 2012), 54 pgs.
(Continued)

*Primary Examiner* — Bob Phunkulh
(74) *Attorney, Agent, or Firm* — Schwegman Lundberg & Woessner, P.A.

(57) ABSTRACT

Apparatuses and methods for supporting multicast device-to-device communications are described herein. A user equipment (UE) may transmit a request to a serving evolved Node B (eNodeB) for permission to transmit to a group of peer UEs. The UE may receive a resource assignment in response to the request. The resource allocation assignment may specify a group identifier. The group identifier may identify a group including the UE and the group of peer UEs.

(Continued)

The UE may transmit a multicast transmission to the group of peer UEs using a resource assigned by the eNodeB with the resource assignment.

20 Claims, 7 Drawing Sheets

(51) Int. Cl.

| | | |
|---|---|---|
| H04W 28/08 | (2009.01) | |
| H04W 24/10 | (2009.01) | |
| H04W 72/04 | (2009.01) | |
| H04W 52/02 | (2009.01) | |
| H04L 5/00 | (2006.01) | |
| H04W 36/22 | (2009.01) | |
| H04L 5/14 | (2006.01) | |
| H04W 48/12 | (2009.01) | |
| H04W 68/00 | (2009.01) | |
| H04L 1/00 | (2006.01) | |
| H04L 1/16 | (2006.01) | |
| H04W 88/08 | (2009.01) | |

(52) U.S. Cl.
CPC .......... *H04L 1/1812* (2013.01); *H04L 1/1854* (2013.01); *H04L 1/1887* (2013.01); *H04L 5/0048* (2013.01); *H04L 5/0053* (2013.01); *H04L 5/0055* (2013.01); *H04L 5/0073* (2013.01); *H04L 5/14* (2013.01); *H04W 4/005* (2013.01); *H04W 24/10* (2013.01); *H04W 28/08* (2013.01); *H04W 36/22* (2013.01); *H04W 48/12* (2013.01); *H04W 52/0206* (2013.01); *H04W 52/0209* (2013.01); *H04W 52/0212* (2013.01); *H04W 52/0245* (2013.01); *H04W 68/00* (2013.01); *H04W 72/042* (2013.01); *H04W 72/046* (2013.01); *H04W 72/0413* (2013.01); *H04W 72/0446* (2013.01); *H04W 88/08* (2013.01); *Y02B 60/50* (2013.01); *Y02E 40/62* (2013.01)

(56) References Cited

U.S. PATENT DOCUMENTS

| 8,005,716 | B1* | 8/2011 | Desikan .................... 705/14.54 |
|---|---|---|---|
| 8,059,597 | B2* | 11/2011 | Park et al. .................... 370/329 |
| 8,112,091 | B2* | 2/2012 | Chun et al. .................... 455/450 |
| 8,199,650 | B2* | 6/2012 | Terry et al. .................... 370/235 |
| 8,320,293 | B2* | 11/2012 | Zheng et al. ................. 370/312 |
| 8,493,865 | B2* | 7/2013 | Terry et al. .................... 370/235 |
| 8,582,593 | B2* | 11/2013 | Chen et al. .................... 370/432 |
| 8,588,259 | B2* | 11/2013 | Papasakellariou et al. .. 370/535 |
| 8,615,433 | B1* | 12/2013 | Desikan .................... 705/14.54 |
| 8,620,376 | B2* | 12/2013 | Kwon et al. ................. 455/552.1 |
| 8,743,797 | B2* | 6/2014 | Park et al. .................... 370/329 |
| 8,750,218 | B2* | 6/2014 | McBeath et al. ............. 370/329 |
| 8,767,739 | B2* | 7/2014 | Meylan ........................ 370/394 |
| 2004/0088348 | A1* | 5/2004 | Yeager ................. H04L 67/104 709/202 |
| 2006/0285927 | A1* | 12/2006 | Hisgrove et al. ............... 405/53 |
| 2008/0144525 | A1 | 6/2008 | Crockett et al. |
| 2008/0205394 | A1* | 8/2008 | Deshpande ......... H04L 12/1854 370/390 |
| 2008/0274759 | A1* | 11/2008 | Chen et al. ................... 455/507 |
| 2008/0305819 | A1* | 12/2008 | Chun et al. ................... 455/509 |
| 2009/0291703 | A1* | 11/2009 | Wang ........................... 455/518 |
| 2009/0310525 | A1* | 12/2009 | Breuer et al. ................. 370/312 |
| 2010/0039979 | A1* | 2/2010 | Takase et al. ................ 370/312 |
| 2010/0085926 | A1* | 4/2010 | Harada et al. ............... 370/329 |
| 2010/0128727 | A1* | 5/2010 | Takechi ....................... 370/392 |
| 2010/0159822 | A1* | 6/2010 | Lim et al. ................... 455/3.06 |
| 2010/0215037 | A1* | 8/2010 | Long et al. .................. 370/352 |
| 2010/0254340 | A1* | 10/2010 | Park et al. ................... 370/329 |
| 2010/0254480 | A1* | 10/2010 | Park et al. ................... 375/295 |
| 2010/0265896 | A1* | 10/2010 | Park et al. ................... 370/329 |
| 2010/0272019 | A1* | 10/2010 | Papasakellariou et al. .. 370/328 |
| 2010/0325226 | A1* | 12/2010 | McBeath et al. ............ 709/206 |
| 2011/0063995 | A1* | 3/2011 | Chen ................. H04L 29/12028 370/254 |
| 2011/0116495 | A1* | 5/2011 | Purkayastha et al. ........ 370/352 |
| 2011/0159799 | A1* | 6/2011 | Chen et al. ................... 455/3.01 |
| 2011/0268006 | A1* | 11/2011 | Koskela et al. ............. 370/312 |
| 2011/0282989 | A1* | 11/2011 | Geirhofer et al. ............ 709/224 |
| 2011/0294474 | A1* | 12/2011 | Barany ................. H04W 8/005 455/414.1 |
| 2012/0069805 | A1* | 3/2012 | Feuersanger et al. ........ 370/329 |
| 2012/0083283 | A1 | 4/2012 | Phan et al. |
| 2012/0129540 | A1 | 5/2012 | Hakola et al. |
| 2012/0224553 | A1* | 9/2012 | Kim et al. .................... 370/329 |
| 2012/0230197 | A1* | 9/2012 | Terry et al. .................... 370/235 |
| 2012/0281566 | A1* | 11/2012 | Pelletier et al. .............. 370/252 |
| 2013/0058220 | A1* | 3/2013 | Yi et al. ......................... 370/241 |
| 2013/0301417 | A1* | 11/2013 | Terry et al. .................... 370/236 |
| 2014/0003320 | A1* | 1/2014 | Etemad et al. ............... 370/312 |
| 2014/0071928 | A1* | 3/2014 | Papasakellariou et al. .. 370/329 |
| 2014/0226552 | A1* | 8/2014 | Niu et al. ....................... 370/312 |
| 2014/0355493 | A1* | 12/2014 | Niu et al. ....................... 370/280 |

FOREIGN PATENT DOCUMENTS

| JP | 2008527884 A | 7/2008 |
|---|---|---|
| JP | 2010539783 A | 12/2010 |
| JP | 2013539265 A | 10/2013 |
| WO | WO-2007040978 A2 | 4/2007 |
| WO | WO-2011051745 A1 | 5/2011 |
| WO | WO-2011088609 A1 | 7/2011 |
| WO | WO-2012015698 A1 | 2/2012 |
| WO | WO-2012071736 A1 | 6/2012 |

OTHER PUBLICATIONS

"International Application Serial No. PCT/US2013/047940, International Search Report mailed Oct. 23, 2013", 3 pgs.

"International Application Serial No. PCT/US2013/047940, Written Opinion mailed Oct. 23, 2013", 6 pgs.

"Multimedia Broadcast/Multicast Service (MBMS); Architecture and functional description", 3GPP TS 23.246 V11.1.0. Technical Specification Group Services and System Aspects. Release 11., (Mar. 2012), 66 pgs.

"International Application Serial No. PCT/US2013/047940, International Preliminary Report on Patentability mailed Jan. 15, 2015", 8 pgs.

"Chinese Application Serial No. 201380029111.9, Voluntary Amendment filed Oct. 16, 2015", 10 pgs.

"European Application Serial No. 13813237.8, Extended European Search Report mailed Mar. 9, 2016", 8 pgs.

"Japanese Application Serial No. 2015-515294, Office Action mailed Oct. 27, 2015", 7 pgs.

"Japanese Application Serial No. 2015-515294, Response filed Jan. 22, 2016 to Office Action mailed Oct. 27, 2015", 15 pgs.

* cited by examiner

| Logical Group ID | IP Address | Group ID | Member ID | Transmissions Data |
|---|---|---|---|---|
| Group ID1 | MC-IP1 | MC-RNTI-1 | MemID1 | LCID(user1, group 1) |
| | | | MemID2 | LCID (user2, group 1) |
| Group ID2 | MC-IP2 | MC-RNTI-2 | MemID1 | LCID(user1, group 2) |
| | | | MemID3 | LCID(user3, group 2) |

USER EQUIPMENT, EVOLVED NODE B, AND METHOD FOR MULTICAST DEVICE-TO-DEVICE COMMUNICATIONS

CROSS-REFERENCE TO RELATED APPLICATIONS

This application claims priority to U.S. Provisional Patent Application No. 61/667,325 entitled "Advanced Wireless Communication Systems and Techniques" filed on Jul. 2, 2012, the content of which is incorporated herein by reference in its entirety.

TECHNICAL FIELD

Embodiments pertain to wireless communications. Some embodiments relate to support for multicast device-to-device communications. Some embodiments relate to coordination of multicast device-to-device communications.

BACKGROUND

Current 3$^{rd}$ Generation Partnership Project (3GPP) long term evolution (LTE) specifications define requirements for device-to-device (D2D) communication. Such communication may be between two devices and current systems may not scale to provide D2D multicast communications. Further, when such communication is extended to multicast D2D operations from a device to a group of peer devices, coordination of such communication may require input from multiple network-side elements such as evolved Node Bs (eNodeBs). Nevertheless, some groups of peer user equipment (UEs) may be located within range of a single eNodeB and coordination for such systems may be simplified.

Thus, there exists a general need to provide methods and apparatuses to enable or optimize device-to-device multicast communications. Further, there exists a general need to provide for coordination for cases when groups of devices are located within a geographic area served by an eNodeB.

DETAILED DESCRIPTION

The following description and the drawings sufficiently illustrate specific embodiments to enable those skilled in the art to practice them. Other embodiments may incorporate structural, logical, electrical, process, and other changes. Various modifications to the embodiments will be readily apparent to those skilled in the art, and the generic principles defined herein may be applied to other embodiments and applications without departing from the scope of the present disclosure. Moreover, in the following description, numerous details are set forth for the purpose of explanation. However, one of ordinary skill in the art will realize that embodiments may be practiced without the use of these specific details. In other instances, well-known structures and processes are not shown in block diagram form in order not to obscure the description of the embodiments with unnecessary detail. Thus, the present disclosure is not intended to be limited to the embodiments shown, but is to be accorded the widest scope consistent with the principles and features disclosed herein.

Figure 1:
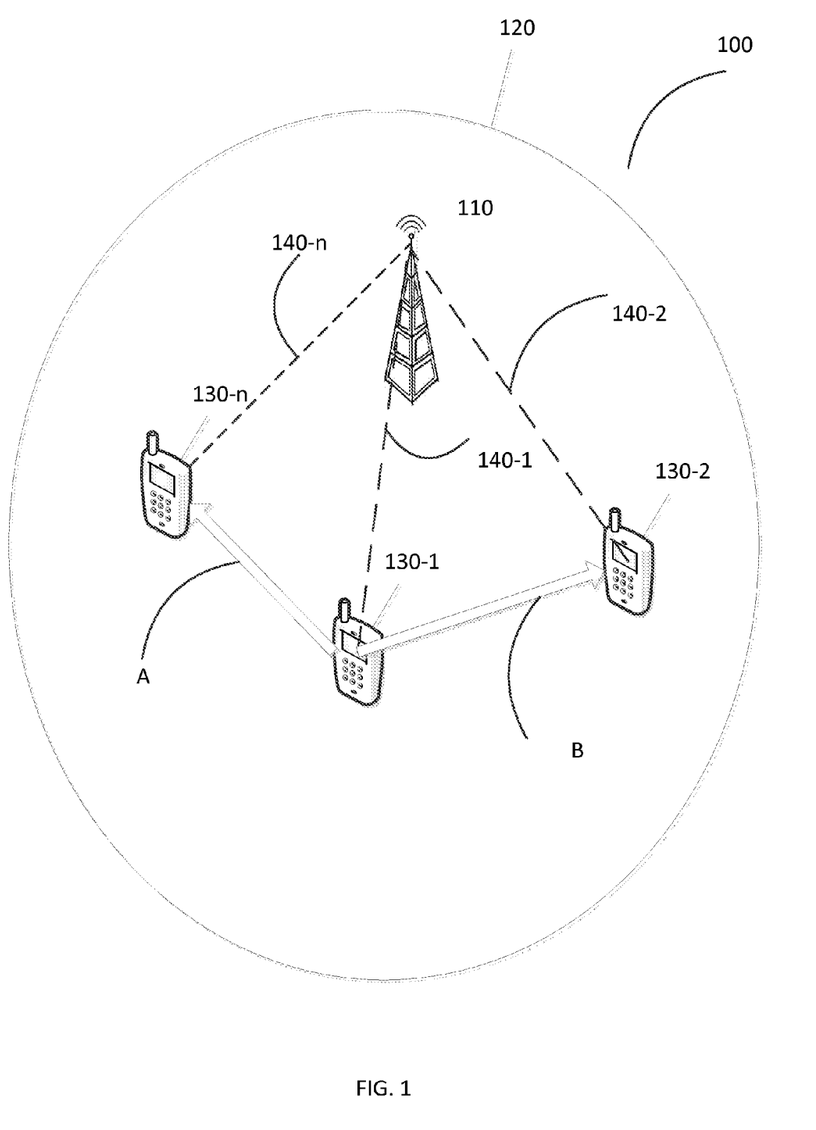
FIG. 1 illustrates an example portion of a wireless communications network according to some embodiments.

FIG. 1 illustrates an example portion of a wireless communications network 100 in which example embodiments may be implemented. In one embodiment, the wireless communications network 100 comprises an evolved universal terrestrial radio access network (EUTRAN) using the 3rd Generation partnership Project (3GPP) long term evolution (LTE) standard. In one embodiment, the wireless communications network 100 includes an evolved Node B (eNodeB) 110. While only one eNodeB 110 is depicted, it will be understood that the wireless communications network 100 may include more than one eNodeB 110.

The eNodeB 110 serves a certain geographic area, or cell 120. One or more user equipments (UEs) 130-1 through 130-n may associate with the eNodeB 110 when the UE 130-1 through 130-n is within the cell 120. The one or more UEs 130-1 through 130-n may hereinafter be referred to as "peer UEs." The peer UEs 130-1 through 130-n may communicate with the eNodeB 110 over uplink/downlink pairs 140-1 through 140-n.

One or more of the peer UEs 130-1 through 130-n may perform multicast communications to other peer UEs 130-1 through 130-n. The peer UEs 130-1 through 130-n may be of a UE type typically controlled by, used, or operated by a human user. For example, the peer UEs 130-1 through 130-n may be a smartphone, tablet computer, or laptop computer. The peer UEs 130-1 through 130-n may communicate with each other over uplinks A and B. While FIG. 1 may depict UE 130-1 transmitting to UE 130-2 and UE 130-n, it will be understood that any peer UE 130-1 through 130-n may transmit to any other peer UE 130-1 through 130-n or to other UEs (not shown) in the cell 120. The peer UEs 130-1 through 130-n may further communicate with other UEs in other cells (not shown).

Some peer-to-peer communication may occur passively, i.e., one of the peer UEs 130-1 through 130-n may perform a majority or all of the multicast transmissions while the other peer UEs 130-1 through 130-n passively listen to the multicasts. For example, peer UEs 130-1 through 130-n may passively listen to advertisements by another peer UE 130-1 through 130-n.

On the other hand, the peer UEs 130-1 through 130-n may perform relatively interactive multicast transmissions requiring closer coordination of resources. In particular, interactive multicast transmissions may be enhanced or enabled by coordination of uplink resources.

Current solutions may not provide support to enable or optimize coordinated multicast device-to-device (D2D) transmissions. Current 3$^{rd}$ Generation Partnership Project (3GPP) long term evolution (LTE) specifications may provide for single D2D communications that may not scale well to enable or optimize interactive multicast D2D communications. Wi-Fi Direct™ (also known as Wi-Fi P2P) may provide coordination and other support for D2D multicast transmissions. However, Wi-Fi Direct solutions may require that the peer UEs 130-1 through 130-*n* remain within Wi-Fi range of each other. Multimedia Broadcast Multicast Services (MBMS) may permit only passive reception by UEs, without providing for interactive multicast among peer UEs 130-1 through 130-*n*.

Example embodiments may provide for direct communication between peer UEs 130-1 through 130-*n*. Example embodiments may provide eNodeB 110 coordination for direct, uplink multicast transmissions between peer UEs 130-1 through 130-*n*.

In example embodiments, the peer UEs 130-1 through 130-*n* may be in proximity to each other, and the peer UEs 130-1 through 130-*n* may exhibit relatively low mobility at least for the duration of the multicast transmissions. In example embodiments, the eNodeB 110 may act as a layer 2 moderator to enable peer UEs 130-1 through 130-*n* to communicate with each other. While example embodiments may enhance, enable, or optimize interactive multicast D2D communication, example embodiments may further permit passive one-way multicast D2D. Example embodiments may further enhance, enable, or optimize multicast machine-type communications. For example, example embodiments may be used for multicast communications between UEs of the type that may normally operate without human interaction.

Figure 2:
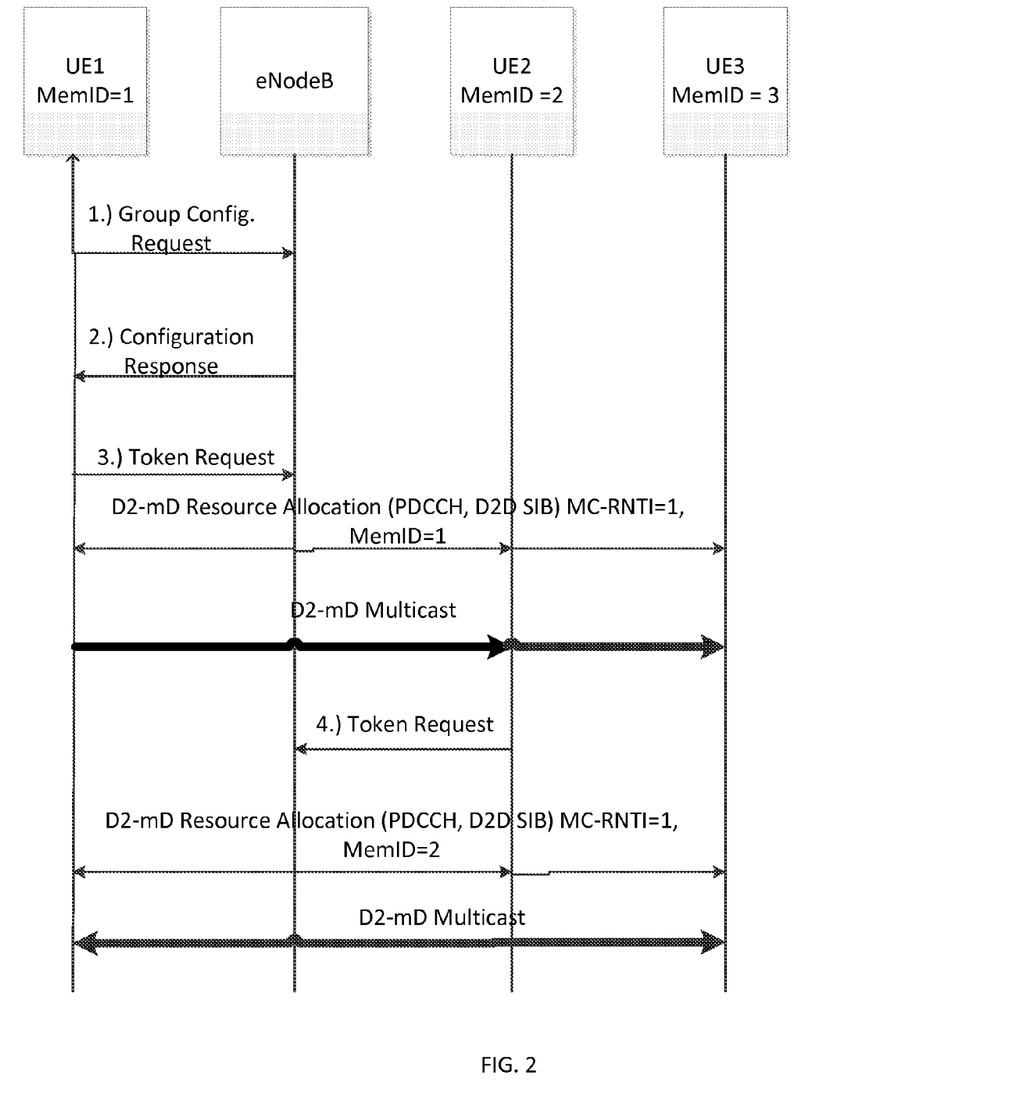
FIG. 2 illustrates an operation flow between a set of UEs and an eNodeB in accordance with example embodiments.

FIG. 2 provides an example illustration of an operation flow for a multicast D2D communication between a set of mobile devices UE1, UE2 and UE3, coordinated through an eNodeB. The UEs UE1, UE2, and UE3 may be suitable as peer UEs 130-1 through 130-*n* (FIG. 1). In the illustrative example, UE1 may perform functionalities of a group owner or sponsor for a group of other UEs UE2 and UE3. While three UEs are shown in the illustrative example, it will be understood that any number of UEs may be in a group.

In message 1, the UE1, acting as the group owner, may request a local group configuration. The UE1 may provide a group ID for the group and the UE1 may provide user identifiers for group members UE2 and UE3. The group invitation and membership may be determined and established through application layer signaling, for example through a "net meeting," group chat applications, Skype, etc. directly between peer applications or through a network server, not shown. Alternatively, the request may be made through an access stratum (AS) message to the eNodeB.

In response, in message 2, the eNodeB may provide a group identifier for the group communications over the corresponding links 140-1 through 140-*n*. The group identifier may be a multicast media access control-layer radio network temporary identifier (MC-RNTI) in accordance with a standard of the 3GPP family of standards. The eNodeB may further provide member identifiers for the UEs UE1, UE2, and UE3. The eNodeB may further provide logical channel group identifiers (LCGID) for those group members that have transmission rights to perform multicast D2D transmissions. These parameters as well as other semi-static radio parameters such as power limitation, etc., may be configured through radio resource control (RRC) signaling. Additionally or alternatively, a group management entity (not shown) may provide group management. The group management entity may be separate from the eNodeB.

Figure 3:
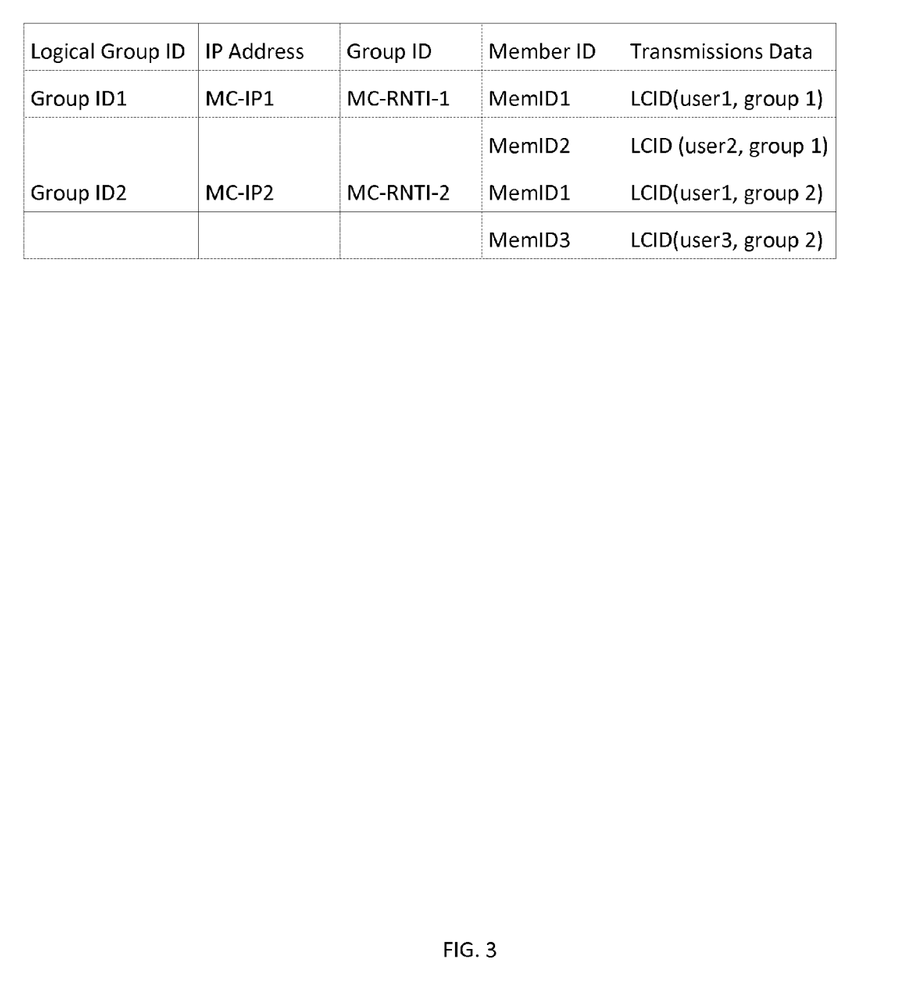
FIG. 3 illustrates an example coordination database in accordance with example embodiments.

The eNodeB or group management entity may maintain a table in, for example, a memory, for mapping and managing group identifiers and logical channels for users. FIG. 3 is an illustrative example of a table according to at least one embodiment. In the illustrative example, the eNodeB coordinates two groups with two logical channel IDs (Group ID1 and Group ID2). The groups have application-level IP addresses MC-IP1 and MC-IP2 and group identifiers MC-RNTI-1 and MC-RNTI-2. Members of the groups are assigned MemIDs, which the eNodeB broadcasts during resource allocation as described above.

In the illustrative example, the member assigned MemID1 is a member of two groups. When the member assigned MemID1 transmits multicast data on the uplink, the group to which the multicast data pertains may be determined based on a group parameter transmitted by that member.

Referring again to FIG. 2, upon configuration of the group, the UE1 may start preparation for multicast D2D transmissions to UE2 and UE3 by first requesting a token in message 3. The token may represent permission to perform multicast transmissions, and the UE1 may transmit the token request to the eNodeB. The token request may be sent as part of a buffer status report (BSR). If the UE1 is already transmitting data on the uplink to the eNodeB, the UE1 may include the token request in the BSR at any time. As a second alternative, the UE1 may send a status report on a physical uplink control channel (PUCCH) and the UE1 may then receive an uplink resource allocation. Under the second alternative, the UE1 may transmit a token request in a BSR upon receiving an uplink resource allocation. As a third alternative, the UE1 may request to schedule transmissions on a random access channel (RACH) with preambles available for random access or those specifically designated for the group by eNodeB through RRC configuration. Upon receiving a RACH response, the UE1 may transmit a token request in a RACH scheduled transmission.

The token request may include a logical channel group identifier (LCGID) of the UE1. As such, the eNodeB may identify the UE1 that is requesting multicast D2D transmission and the eNodeB may grant the uplink channel resources to be used for such D2D communications. The eNodeB may transmit a broadcast resource assignment message over, for example, a physical downlink control channel (PDCCH), an enhanced PDCCH (ePDCCH) or a D2D system information block (SIB), to all UE1, UE2, UE3 in the group. In the broadcast message, the eNodeB may include the group MC-RNTI and the member identifier (MemID) for the transmitting UE1. The UEs in the group may use the MC-RNTI to unmask downlink control indicators (DCI) when PDCCH is used. Using the MC-RNTI, therefore, any UEs in the group may then use the MC-RNTI to detect valid DCIs and the UEs can then receive the multicast content on the allocated uplink resource channel. The broadcast message may include other parameters pertinent to the D2D multicast communications such as the modulating and coding scheme (MCS), transmission mode, and maximum power levels. UEs may then apply open loop power control subject to this maximum power setting as set by the eNodeB.

The UE1 may then perform multicast D2D transmission on the allocated D2D channel resource. Thereafter, when one of the UEs UE2 or UE3 receives communications on the allocated uplink channel resource, the UEs UE2 and UE3 may determine that the communications are group communications based on the MC-RNTI. The UEs UE2 and UE3 will further be able to determine that communications are being transmitted by UE1 based on the MemID included in the D2D resource assignment from the eNodeB.

Similarly, UE2 may request a token for permission to perform multicast D2D transmissions in message 4. The eNodeB may similarly assign an uplink channel resource and broadcast a message including the MC-RNTI and the MemID of UE2. UE2 may then perform multicast D2D transmission on the uplink channel resource.

The eNodeB may also apply semi-persistent scheduling of resources. For example, the eNodeB may not schedule resources each time a UE makes a token request. Instead, the eNodeB may allocate multiple resources so that the UE may transmit multiple times without necessitating a token request between each transmission.

Figure 4:
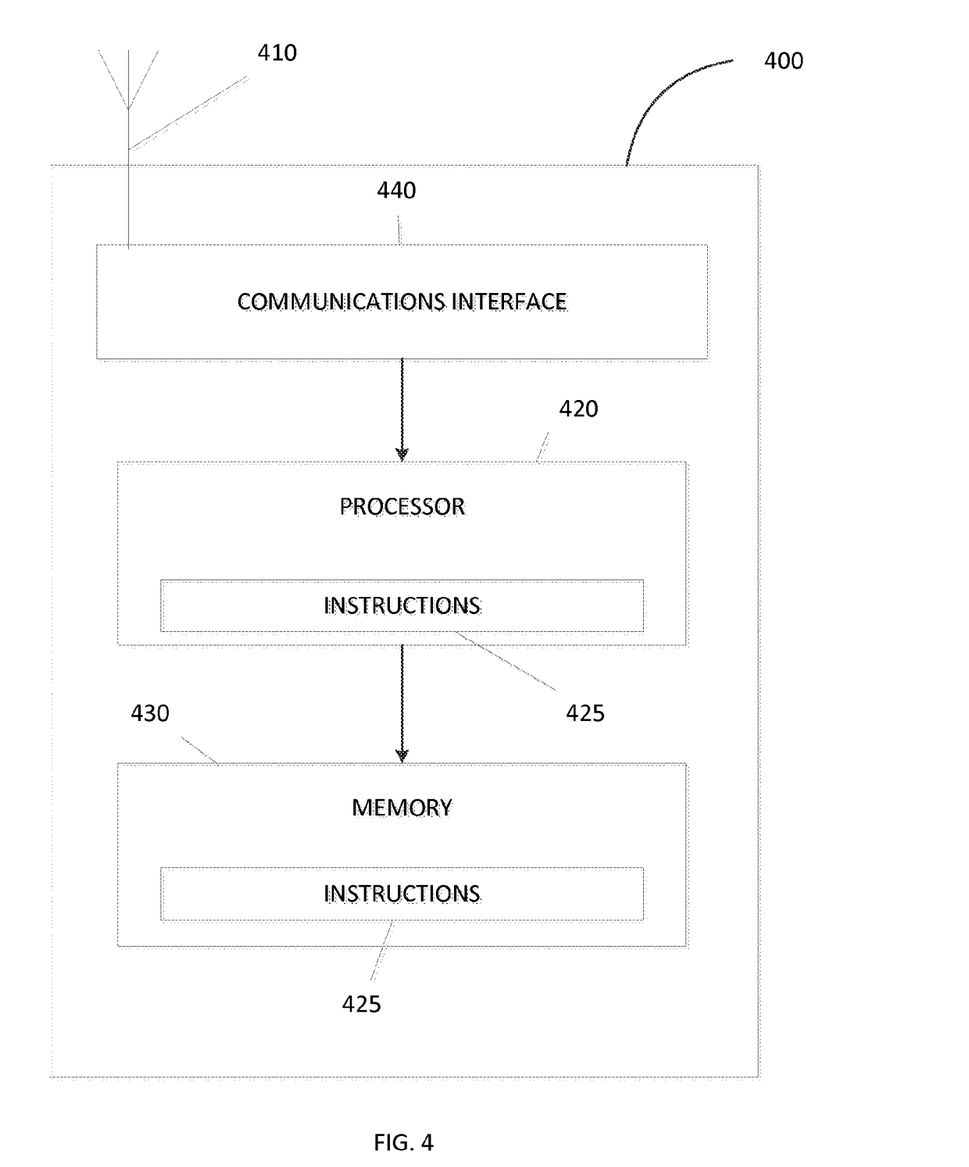
FIG. 4 is a block diagram of a user equipment (UE) in accordance with example embodiments.

FIG. 4 shows the basic components of a UE 400 in accordance with some embodiments. The UE 400 may be suitable as a peer UE 130-1 through 130-n (FIG. 1) or as UE1, UE2, or UE3 (FIG. 2). The UE 400 may support methods for multicast D2D communication, in accordance with embodiments. The UE 400 includes one or more antennas 410 arranged to communicate with a base station (BS), the eNodeB 110, or other types of wireless local area network (WLAN) access points. The UE 400 further includes a processor 420, instructions 425, and a memory 430. The UE 400 may further include a communications interface 440. In one embodiment, the memory 430 includes, but is not limited to, random access memory (RAM), dynamic RAM (DRAM), static RAM (SRAM), synchronous DRAM (SDRAM), double data rate (DDR) SDRAM (DDR-SDRAM), or any device capable of supporting high-speed buffering of data.

Example embodiments allow a UE 400 to perform multicast D2D transmissions to peer UEs 130-1 through 130-n, and to respond to multicast D2D transmissions as described above with respect to FIG. 2. In at least one embodiment, the communications interface 440 is, for example, a wireless physical layer which operates according to a multiple input/multiple output (MIMO) operation. As described above with respect to FIG. 2, when the UE 400 is a group owner, the UE 400 may request configuration of a group of peer UEs 130-1 through 130-n. The communications interface 440 may transmit a request to a serving eNodeB 110 for permission to transmit to a group of peer UEs 130-1 through 130-n (FIG. 1). The communications interface 440 may transmit the request within a buffer status report (BSR). The request may include a logical channel group identifier (LCGID) of the UE 400. The request may be in the form of a token request on the uplink. Further details concerning the request are described above with respect to FIG. 2.

The communications interface 440 may receive a resource allocation assignment in response to the request. As described above with respect to FIG. 2, the communication interface 440 may receive the resource allocation assignment over a physical downlink control channel (PDCCH) or an enhanced PDCCH (ePDCCH). The communications interface 440 may receive the resource allocation assignment through broadcast of a D2D system information broadcasting (D2D SIB) block. The resource may comprise, for example, one or more physical resource blocks (PRBs) of a physical uplink shared channel (PUSCH). The resource may be on a frequency carrier specially designed for D2D communications.

The communications interface 440 may respond to multicast transmissions by a peer UE of the group of peer UEs 130-1 through 130-n. The responding may include requesting, using a logical group channel identifier of the UE 400, permission to transmit on the uplink resource. The communications interface 440 may transmit the request within a buffer status report (BSR). The request may include a logical channel group identifier (LCGID) of the UE 400. The request may be in the form of a token request on the uplink.

Upon receiving permission to transmit, the communications interface 440 may transmit at least one multicast transmission frame to the group of peer UEs 130-1 through 130-n using a resource assigned by the serving eNodeB 110.

As described previously, the resource allocation assignment may specify a group identifier. The group identifier may identify a group including the UE 400 and the group of peer UEs 130-1 through 130-n (FIG. 1). The resource assigned may be an uplink resource. The group identifier may be a multicast media access control-layer radio network temporary identifier (MC-RNTI) in accordance with a standard of the 3GPP family of standards.

The processor 420 may include logic or code to enable the UE 400 to process signals received from the network through the antenna 410. The processor 420 may include code or other instructions 425 to allow the UE 400 to transmit, receive, or respond to multicast D2D transmissions. The instructions 425 may further allow the UE 400 to initiate signaling to configure the group of peer UEs 130-1 through 130-n (FIG. 1), and to request that a peer UE 130-1 through 130-n be added to or removed from the group of peer UEs 130-1 through 130-n. The instructions 425 may further allow the UE 400 to receive a notification that transmission privileges have been revoked and to terminate use of the LCGID based on the notification. The instructions 425 may additionally or alternatively reside in the memory 430. The processor 420 and the memory 430 may therefore comprise computer-readable media.

Figure 5:
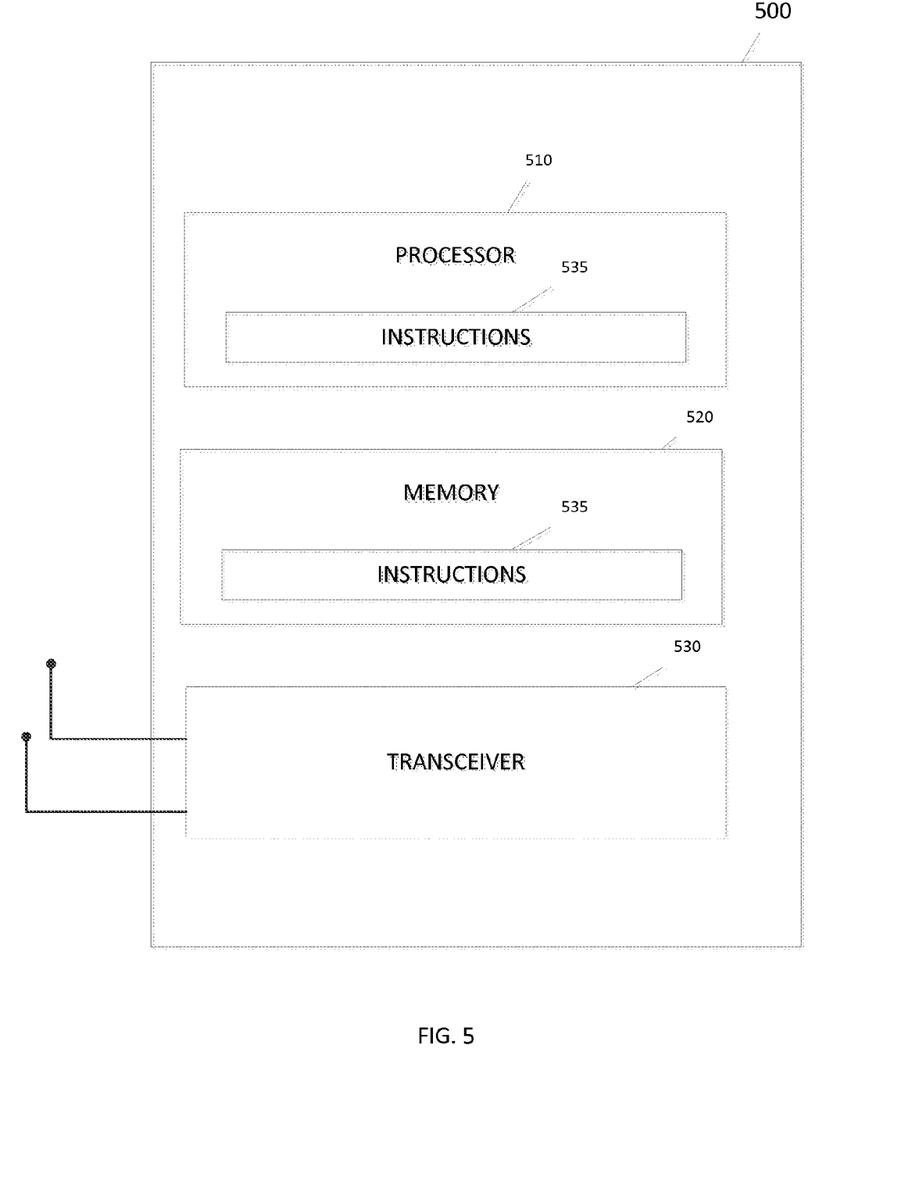
FIG. 5 is a block diagram of an eNodeB in accordance with example embodiments.

FIG. 5 illustrates an example block diagram showing details of an eNodeB 500 according to some embodiments. The eNodeB 500 may be suitable as an eNodeB 110 (FIG. 1) or eNodeB (FIG. 2). The eNodeB 500 may control group D2D communications. The eNodeB 500 may include a processor 510, a memory 520, a transceiver 530, and instructions 535. The eNodeB 500 may include other elements (not shown).

The processor 510 comprises one or more central processing units (CPUs), graphics processing units (GPUs), or both. The processor 510 provides processing and control functionalities for the eNodeB 200. Memory 520 comprises one or more transient and static memory units configured to store instructions 535 and data for the eNodeB 500. The memory 520 may further be arranged to store a table such as the table depicted in FIG. 3.

The transceiver 530 comprises one or more transceivers including a multiple-input and multiple-output (MIMO) antenna to support MIMO communications. The transceiver 530 receives uplink transmissions and transmits downlink transmissions, among other things, from and to UEs 130-1 through 130-n (FIG. 1).

The instructions 535 comprise one or more sets of instructions or software executed on a computing device (or machine) to cause such computing device (or machine) to perform any of the methodologies discussed herein. The instructions 535 (also referred to as computer- or machine-executable instructions) may reside, completely or at least partially, within the processor 510 and/or the memory 520 during execution thereof by the eNodeB 500. The processor 510 and memory 520 also comprise machine-readable media.

The transceiver 530 may receive a request from a UE served by the eNodeB 500. For example, the transceiver 530 may receive a request from one or more of the peer UEs 130-1 through 130-n (FIG. 1) or from UE1, UE2 or UE3 (FIG. 2). The request may be for permission to transmit a multicast message to a group of peer UEs. The group of peer UEs may be served by the eNodeB 500.

The processor 510 may assign an uplink resource to the requesting UE based on the request. The resource grant of the uplink resource may specify a group identifier for the group of peer UEs and a member identifier for the requesting UE.

The processor 510 may determine that one or more of the peer UEs 130-1 through 130-n has left or is about to leave the geographical area, or cell 120 served by the eNodeB 110 (FIG. 1). The processor 510 may transmit coordination information to a second eNodeB (not shown). The coordination information may include the group identifier for the group of peer UEs 130-1 through 130-n. The second eNodeB may serve the geographical area that is being entered by the one or more peer UEs 130-1 through 130-n.

The processor 510 may coordinate requests for permission to transmit multicast messages. The requests may be received from one or more peer UEs 130-1 through 130-n of the group of peer UEs 130-1 through 130-n.

Figure 6:
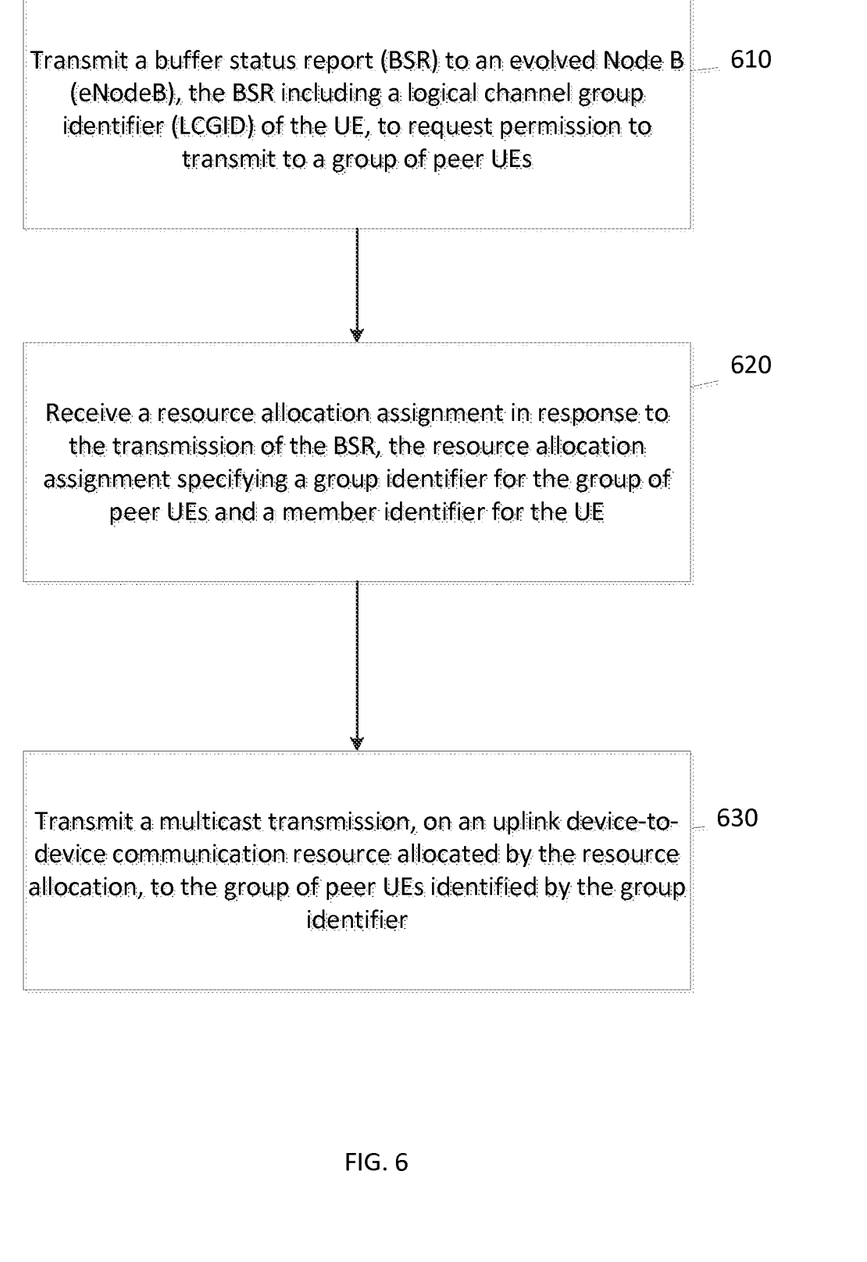
FIG. 6 is a flow diagram of a procedure for multicast device-to-device communications in accordance with example embodiments.

FIG. 6 illustrates operations implemented by a UE, for example a peer UE 130-1 through 130-n, for performing multicast D2D communication. In an illustrative example, the UE 130-1 performs these operations. Nevertheless, it will be understood that one or more of any of the peer UEs 130-1 through 130-n may perform these operations.

In operation 610, the UE 130-1 transmits a buffer status report (BSR) to an eNodeB (110) to request permission to transmit to a group of peer UEs 130-1 through 130-n. The BSR may include a logical channel group identifier (LCGID) of the UE 130-1.

In operation 620, the UE 130-1 may receive a resource allocation assignment in response to the transmission of the BSR. The resource allocation assignment may specify a group identifier for a group of peer UEs 130-1 through 130-n. The group identifier may be a multicast media access control-layer radio network temporary identifier (MC-RNTI) in accordance with a standard of the 3GPP family of standards. The UE 130-1 may receive the resource allocation assignment through D2D system information broadcasting. The resource allocation assignment may specify a member identifier for the UE. The resource allocation assignment may further specify a physical layer parameter as described above with respect to FIG. 2. The physical layer parameter may include a transmit power. They physical layer parameter may include a scheme for modulation and coding.

In operation 630, the UE 130-1 may transmit a multicast transmission to the group of peer UEs 130-1 through 130-n on the uplink D2D communication resource allocated by the resource allocation. The UE 130-1 may terminate use of its LCGID upon receiving a notification that transmission is no longer authorized.

The UE 130-1 may initiate signaling to configure the group of peer UEs 130-1 through 130-n. For example, the UE 130-1 may act as group sponsor as described in further detail below. In response to the initiating, the UE 130-1 may receive the group identifier (MC-RNTI) for the group of peer UEs 130-1 through 130-n. The UE 130-1, in its role as a group sponsor, may request that a peer UE 130-1 through 130-n be added to or removed from the group of peer UEs 130-1 through 130-n.

Figure 7:
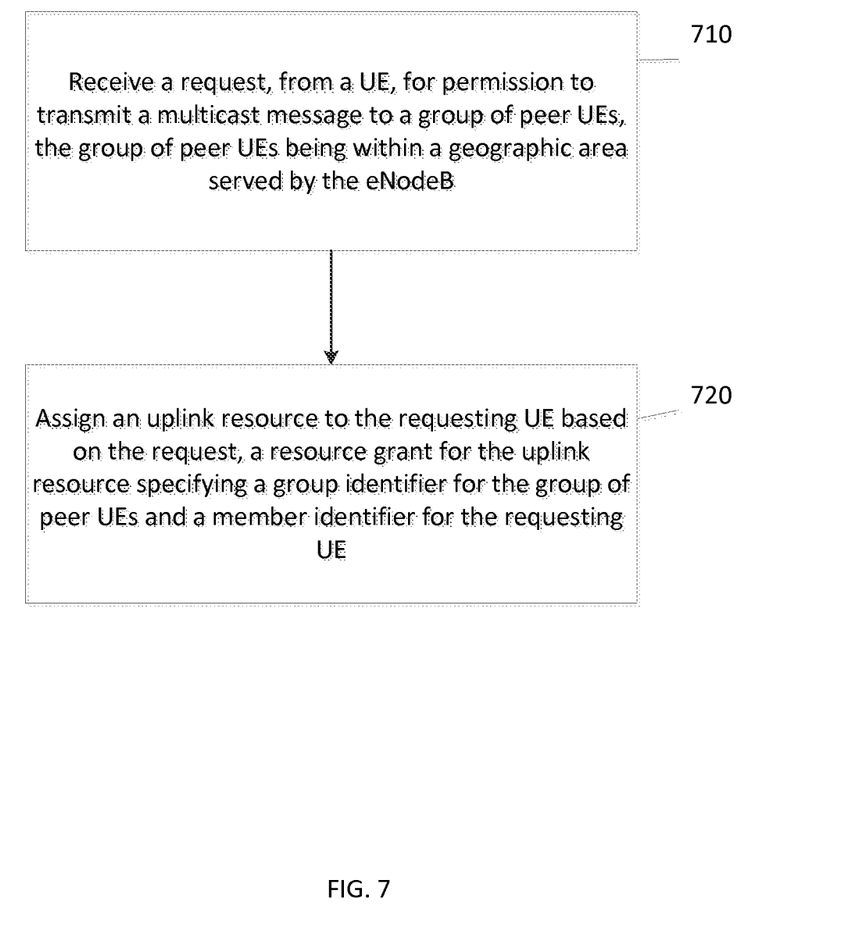
FIG. 7 is a flow diagram of a procedure for controlling group device-to-device communications in accordance with example embodiments.

FIG. 7 illustrates operations implemented by an eNodeB, for example eNodeB 110, for controlling group D2D communications. In operation 710, the eNodeB 110 receives a request from a UE for permission to transmit a multicast message to a group of peer UEs. For example, the eNodeB 110 may receive a request from the UE 130-1 for permission to transmit multicast messages to UEs 130-2 and 130-n. The group of peer UEs may be located within a geographic area served by the eNodeB 110.

In operation 720, the eNodeB 110 may assign an uplink resource to the UE 130-1 based on the request. A resource grant for the uplink resource may specify a group identifier for the group of peer UEs and a member identifier for the requesting UE (UE 130-1 in an illustrative example).

The eNodeB 110 may determine that a UE of the group of peer UEs is leaving the geographic area served by the eNodeB 110. The eNodeB 110 may therefore transmit coordination information to a second eNodeB. The coordination information may include the group identifier for the group of peer UEs. The second eNodeB (not shown) may serve the UEs that are leaving the geographic area served by the eNodeB 110.

The embodiments as described above may be implemented in various hardware configurations that may include a processor for executing instructions that perform the techniques described. Such instructions may be contained in a suitable storage medium from which they are transferred to a memory or other processor-executable medium.

It will be appreciated that, for clarity purposes, the above description describes some embodiments with reference to different functional units or processors. However, it will be apparent that any suitable distribution of functionality between different functional units, processors or domains may be used without detracting from embodiments. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present inventive subject matter has been described in connection with some embodiments, it is not intended to be limited to the specific form set forth herein. One skilled in the art would recognize that various features of the described embodiments may be combined in accordance with the disclosure. Moreover, it will be appreciated that various modifications and alterations may be made by those skilled in the art without departing from the scope of the disclosure.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. User Equipment (UE) comprising circuitry to:
   transmit a request to a serving evolved Node B (eNodeB) for permission to transmit to a group of peer UEs, wherein the group of peer UEs is established using application layer signaling directly between peer applications running on respective peer UEs of the group of peer UEs, wherein the peer applications include one of a net meeting application, a group chat application, and Skype;
   receive a resource allocation assignment in response to the request, the resource allocation assignment specifying a group identifier, the group identifier identifying a group including the UE and the group of peer UEs, wherein the group identifier is a multicast media access control-layer radio network temporary identifier (MC-RNTI) in accordance with a standard of the 3rd Generation Partnership Project (3GPP) family of standards for long term evolution (LTE); and transmit a D2D multicast transmission to the group of peer UEs using a resource assigned by the serving eNodeB.

2. The UE of claim 1, wherein the circuitry is further arranged to transmit the request within a buffer status report (BSR), the request including a logical channel group identifier (LCGID) of the UE.

3. The UE of claim 1, wherein the resource is an uplink resource, and the resource comprises a physical resource block (PRB) of a physical uplink shared channel (PUSCH).

4. The UE of claim 1, wherein the resource comprises a physical resource block (PRB) of a frequency carrier specially designed for device-to-device communications.

5. The UE of claim 1, wherein the resource allocation assignment is received over a physical downlink control channel (PDCCH) or enhanced PDCCH (ePDCCH).

6. The UE of claim 1, wherein the resource allocation assignment is received through a broadcast of a device-to-device system information block (D2D SIB).

7. The UE of claim 1, further comprising processing circuitry to:
initiate signaling to configure the group of peer UEs and request that a peer UE be removed from or added to the group of peer UEs and wherein the group of peer UEs are within a proximity such that the group of peer UEs and the UE are within coverage of a same eNodeB.

8. The UE of claim 1, wherein the circuitry is further arranged to:
request, using a logical group channel identifier (LGCID) of the UE, permission to transmit on the uplink resource, and upon receiving permission to transmit, transmit at least one multicast transmission frame using the uplink resource in response to a multicast transmission by a peer UE.

9. The UE of claim 8, wherein the circuitry is further arranged to:
receive notification that transmission privileges have been revoked; and
terminate use of the LCGID of the UE based on the notification.

10. An evolved Node B (eNodeB) to control group device-to-device communications, the eNodeB comprising:
a communications interface arranged to receive a request, from a user equipment (UE) served by the eNodeB, for permission to transmit a multicast message to a group of peer UEs, the group of peer UEs being served by the eNodeB, wherein the group of peer UEs is established using application layer signaling directly between peer applications running on respective peer UEs of the group of peer UEs, wherein the peer applications include one of a net meeting application, a group chat application, and Skype, one or more processors arranged to assign an uplink resource to the UE based on the request, a resource grant of the uplink resource specifying a group identifier for the group of peer UEs and a member identifier for the requesting UE, wherein the group identifier is a multicast media access control-layer radio network temporary identifier (MC-RNTI) in accordance with a standard of the 3$^{rd}$ Generation Partnership Project (3GPP) family of standards for long term evolution (LTE), and coordinate requests, received from peer UEs in the group of peer UEs, for permission to transmit D2D multicast messages to the group of peer UEs.

11. The eNodeB of claim 10, wherein the one or more processors are further arranged to determine that a UE of the group of peer UEs is leaving the geographical area served by the eNodeB, and the communications interface is further arranged to transmit coordination information to a second eNodeB, the coordination information including the group identifier for the group of peer UEs, the second eNodeB serving the UE that is leaving the geographical area served by the eNodeB.

12. A method, performed by user equipment (UE), for multicast device-to-device communications, the method comprising:
transmitting a buffer status report (BSR) to an evolved Node B (eNodeB), the BSR including a logical channel group identifier (LCGID) of the UE, to request permission to transmit to a group of peer UEs, wherein the group of peer UEs is established using application layer signaling directly between peer applications running on respective peer UEs of the group of peer UEs, wherein the peer applications include one of a net meeting application, a group chat application, and Skype;
receiving a resource allocation assignment in response to the transmission of the BSR, the resource allocation assignment specifying a group identifier for the group of peer UEs and a member identifier for the UE; and
transmitting a D2D multicast transmission, on an uplink device-to-device communication resource allocated by the resource allocation, to the group of peer UEs identified by the group identifier.

13. The method of claim 12, further comprising:
initiating signaling to configure the group of peer UEs; and
receiving, in response to the initiating, the group identifier for the group of peer UEs.

14. The method of claim 13, further comprising:
requesting that a peer UE be removed or added to the group of peer UEs.

15. The method of claim 13, wherein the resource comprises a physical resource block (PRB) of a physical uplink shared channel (PUSCH) on uplink frequency carrier or a physical resource block in a frequency carrier specially designed for device-to-device communications.

16. The method of claim 12, wherein the resource allocation assignment is received over a physical downlink control channel (PDCCH) or enhanced PDCCH (ePDCCH) or through device-to-device system information broadcasting (D2D SIB).

17. The method of claim 16, wherein the resource allocation assignment further specifies a physical layer parameter, and the physical layer parameter includes at least one of a transmit power and scheme for modulation and coding.

18. The method of claim 12, further comprising:
terminating use of a LCGID based on receiving a notification that transmission is no longer authorized.

19. A method, performed by an evolved Node B (eNodeB), for controlling group device-to-device communications, the method comprising:
receiving a request, from a user equipment (UE), for permission to transmit a multicast message to a group of peer UEs, the group of peer UEs being within a geographic area served by the eNodeB, wherein the group of peer UEs is established using application layer signaling directly between peer applications running on respective peer UEs of the group of peer UEs, wherein the peer applications include one of a net meeting application, a group chat application, and Skype; and assigning an uplink resource to the requesting UE based on the request, a resource grant for the uplink resource specifying a group identifier for the group of peer UEs and a member identifier for the requesting UE, wherein the group identifier is a multicast media access control-layer radio network temporary identifier (MC-RNTI) in accordance with a standard of the $3^{rd}$ Generation Partnership Project (3GPP) family of standards for long term evolution (LTE).

20. The method of claim 19, further comprising:
determining that a UE of the group of peer UEs is leaving the geographic area served by the eNodeB; and
transmitting coordination information to a second eNodeB, the coordination information including the group identifier for the group of peer UEs, the second eNodeB serving the UE that is leaving the geographic area served by the eNodeB.

* * * * *